United States Patent
Van Den Brink

(10) Patent No.: US 9,364,978 B2
(45) Date of Patent: Jun. 14, 2016

(54) METHOD AND DEVICE FOR ARRANGING A LABEL IN A MOULD

(75) Inventor: Willem Van Den Brink, Harskamp (NL)

(73) Assignee: POLYMAC B.V., Ede (NL)

( * ) Notice: Subject to any disclaimer, the term of this patent is extended or adjusted under 35 U.S.C. 154(b) by 480 days.

(21) Appl. No.: 13/880,984

(22) PCT Filed: Oct. 26, 2011

(86) PCT No.: PCT/NL2011/050728
§ 371 (c)(1),
(2), (4) Date: Jul. 9, 2013

(87) PCT Pub. No.: WO2012/078034
PCT Pub. Date: Jun. 14, 2012

(65) Prior Publication Data
US 2013/0277883 A1    Oct. 24, 2013

(30) Foreign Application Priority Data

Oct. 26, 2010  (NL) .................................... 2005581

(51) Int. Cl.
*B29C 45/14*    (2006.01)

(52) U.S. Cl.
CPC . *B29C 45/14008* (2013.01); *B29C 2045/14057* (2013.01)

(58) Field of Classification Search
CPC .............. B29C 33/12; B29C 45/14008; B29C 2045/14057; B29C 2045/14918; B29C 2045/14926; B29C 49/2408; B29C 2049/241; B29C 51/16; B29C 51/165
USPC ............................................. 264/509; 425/95
See application file for complete search history.

(56) References Cited

U.S. PATENT DOCUMENTS 3,108,850 A * 10/1963 Brandt ..................... B29C 49/24
264/275
3,559,248 A * 2/1971 Stockman ......... B29C 45/14008
264/255

(Continued)

FOREIGN PATENT DOCUMENTS

CN      1252747 A    5/2000
CN    101337406 A    1/2009
(Continued)

OTHER PUBLICATIONS

International Search Report issued Feb. 6, 2012, in PCT/NL11/50728 filed Oct. 26, 2011.

(Continued)

*Primary Examiner* — Timothy Kennedy
(74) *Attorney, Agent, or Firm* — Banner & Witcoff, Ltd.

(57) ABSTRACT

Methods and structures are shown for a variety of ways to arrange a label in a mould cavity. One is a method for arranging a label in a mould cavity of a mould, which mould cavity is delimited by an internal peripheral surface that defines a first axial axis of the mould cavity, the method comprising: providing a mandrel having a peripheral wall that defines an axial direction and a peripheral direction, wherein the peripheral wall further defines a second axial axis, the peripheral wall being provided with: a peripheral part having a shape that substantially corresponds to a shape of a part of the internal peripheral surface of the mould cavity, and a non-convex part that extends in the axial direction of the peripheral wall of the mandrel, arranging the label around the peripheral wall of the mandrel, which label comprises a first side edge part and a second side edge part, in which the label is arranged around the peripheral wall of the mandrel in such a manner that the second side edge part overlaps the first side edge part viewed in the peripheral direction of the mandrel at a location of the non-convex part of the peripheral wall of the mandrel, introducing the mandrel with the label arranged around the peripheral wall thereof into the mould cavity, transferring the label from the peripheral wall of the mandrel to the internal peripheral surface of the mould cavity, wherein the mandrel and the mould are arranged with respect to one another in such a manner during transfer of the label from the peripheral wall of the mandrel to the internal peripheral surface of the mould cavity, that the first axial axis of the internal peripheral surface of the mould cavity and the second axial axis of the peripheral wall of the mandrel are eccentric with respect to one another.

19 Claims, 8 Drawing Sheets

(56) References Cited

U.S. PATENT DOCUMENTS

| | | | |
|---|---|---|---|
| 3,801,689 A * | 4/1974 | Langecker | B29C 49/2408 156/232 |
| 4,108,587 A | 8/1978 | Rumball | |
| 5,198,247 A * | 3/1993 | Bartimes | B29C 49/2408 156/DIG. 31 |
| 5,266,149 A * | 11/1993 | Collette | B29C 49/2408 156/567 |
| 6,264,876 B1 * | 7/2001 | Ballay | B29C 49/2408 264/509 |
| 6,790,400 B1 | 9/2004 | Muller et al. | |
| 2010/0186892 A1 * | 7/2010 | Blitshteyn | B29C 31/008 156/273.1 |
| 2010/0226705 A1 | 9/2010 | Crutchley | |

FOREIGN PATENT DOCUMENTS

| | | | |
|---|---|---|---|
| CN | 101835586 A | 9/2010 | |
| NL | WO 0236320 A1 * | 5/2002 | ........ B29C 45/14008 |
| NL | 1020248 | 9/2003 | |
| NL | 1020248 C2 | 9/2003 | |
| WO | 2006082006 A1 | 8/2006 | |
| WO | 2011038523 A1 | 4/2011 | |

OTHER PUBLICATIONS

Dutch Search Report issued Jun. 10, 2011, in NL Patent Application No. 205581 filed Oct. 26, 2010.

Oct. 10, 2012—(CN) Notification of the First Office Action—App 2011800518674—Eng Tran.

* cited by examiner

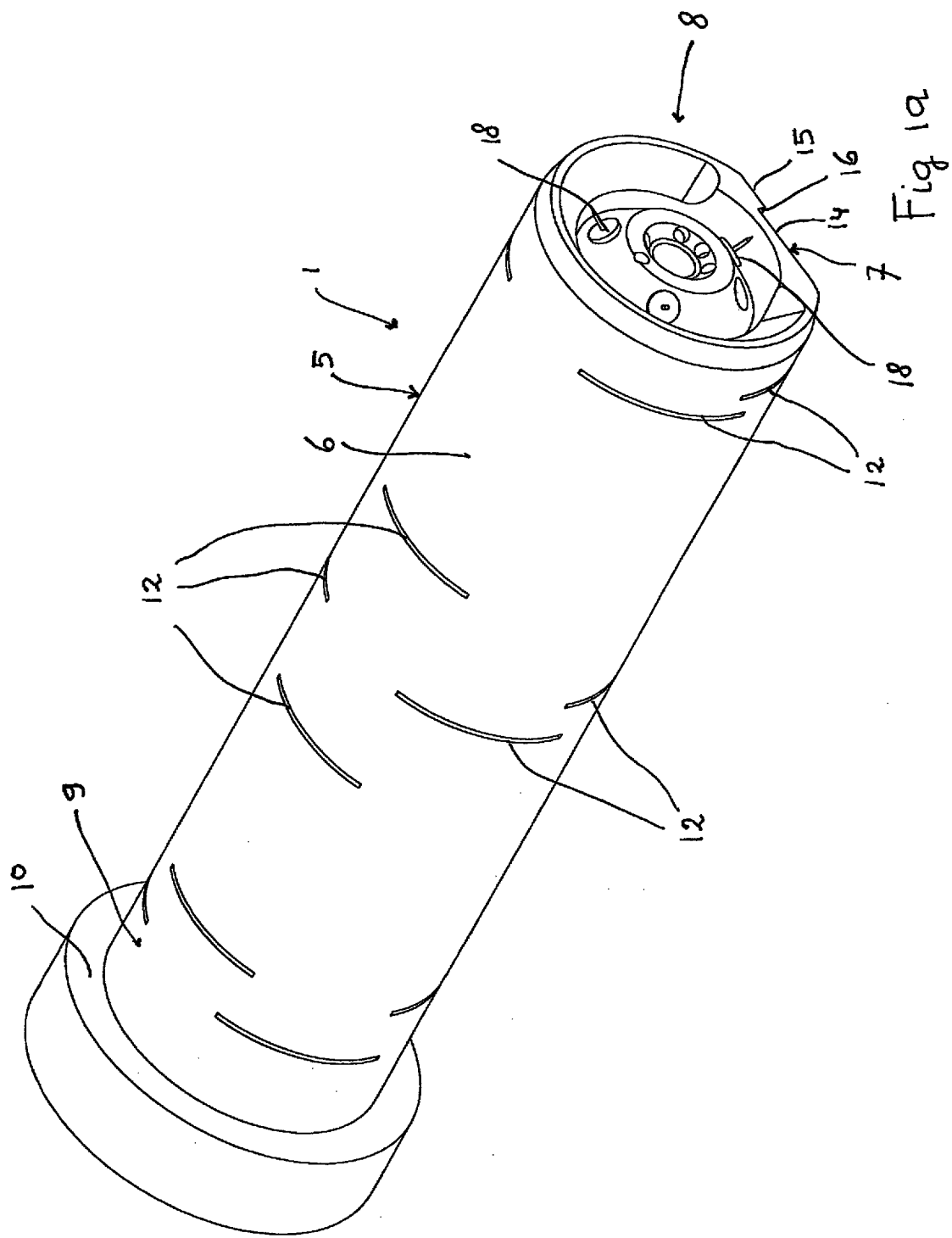

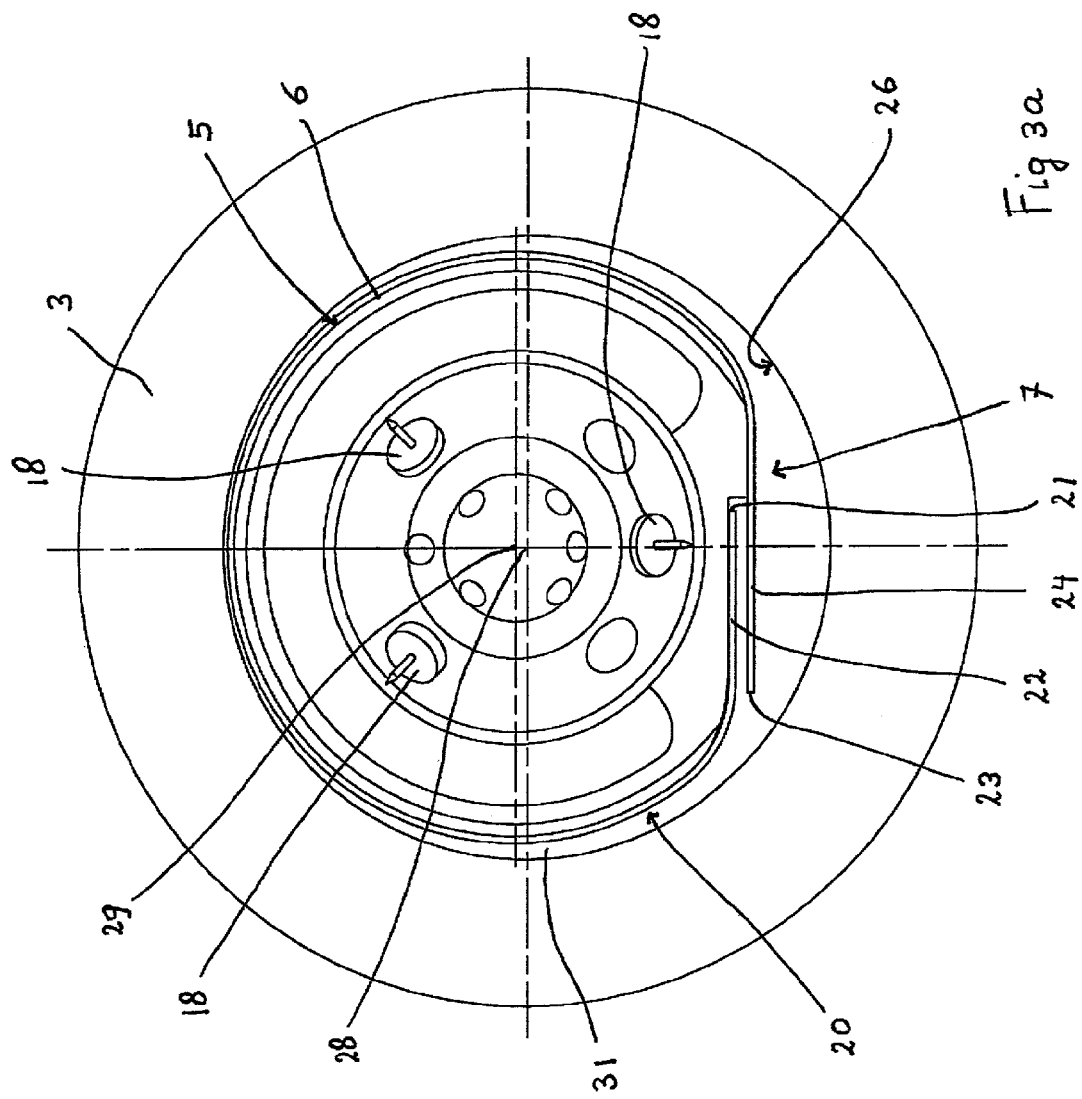

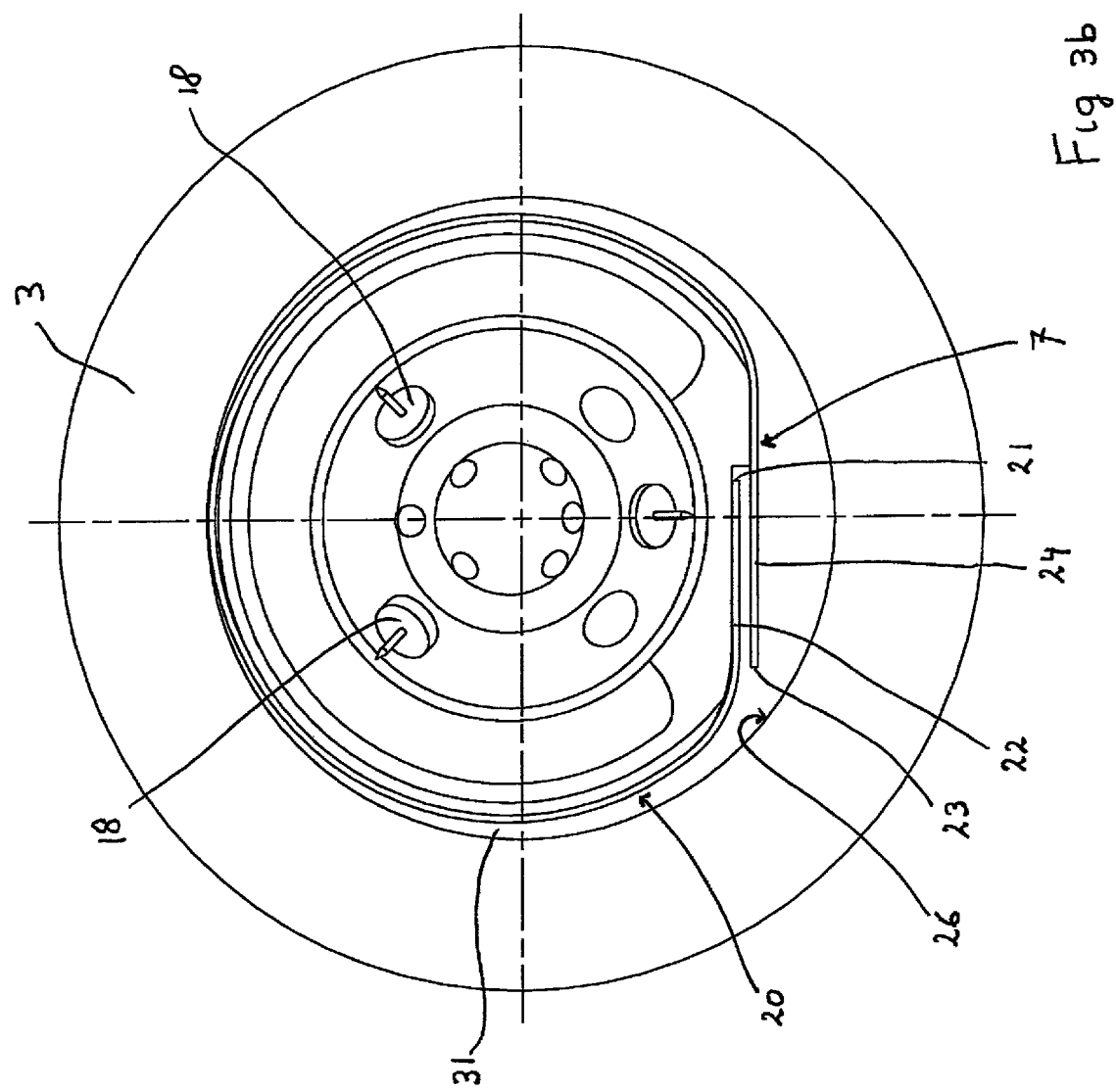

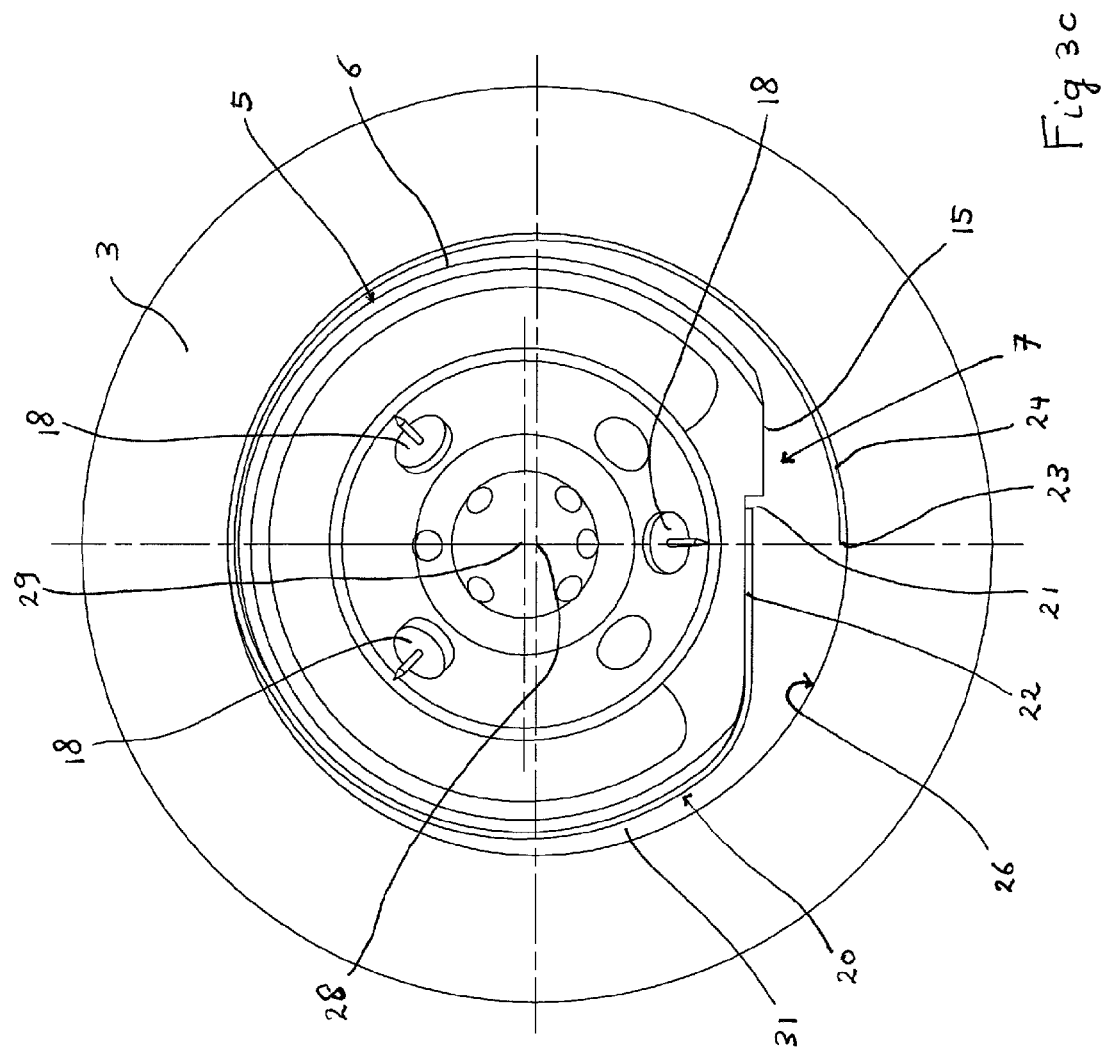

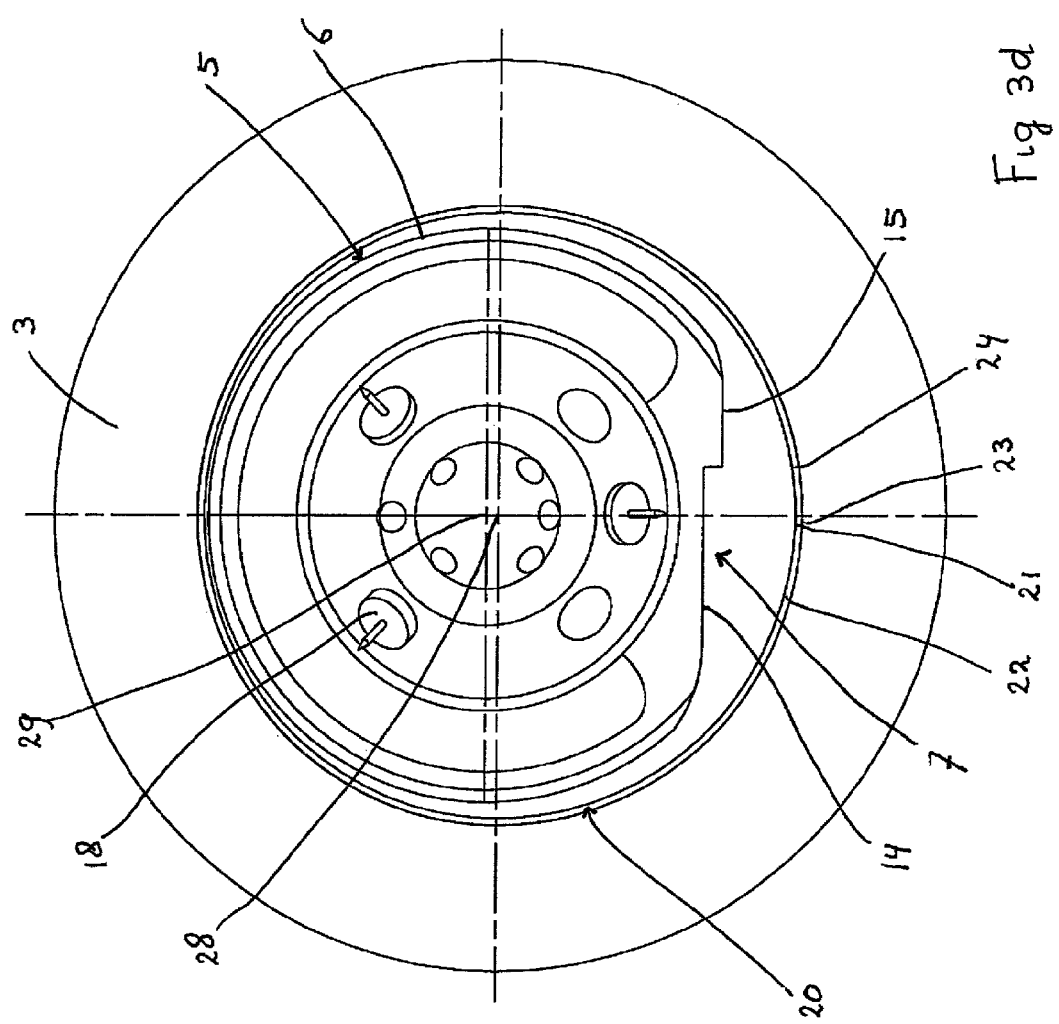

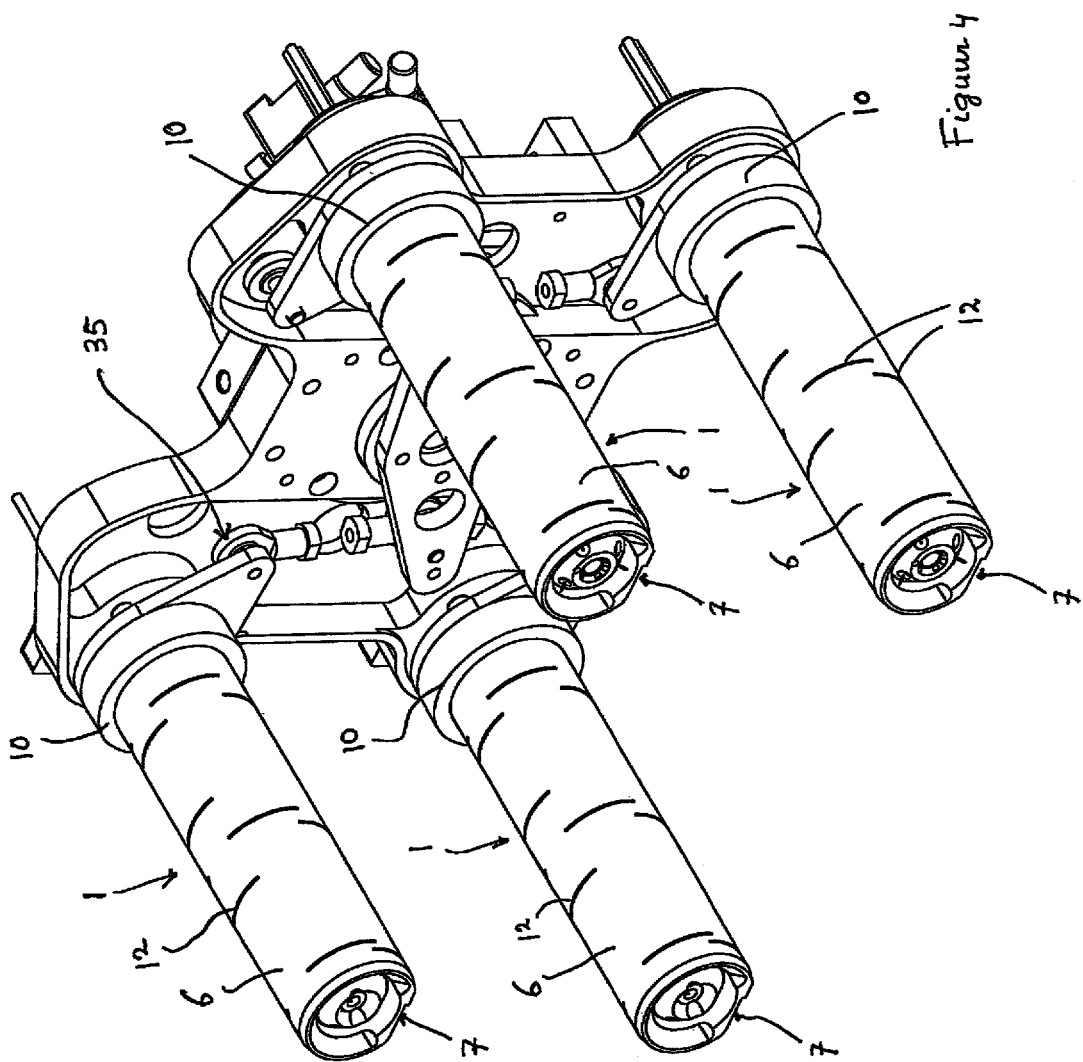

METHOD AND DEVICE FOR ARRANGING A LABEL IN A MOULD

The present application is a U.S. National Phase filing of International Application No. PCT/NL2011/050728, filed on Oct. 26, 2011, designating the United States of America and claiming priority to Dutch Patent Application No. 2005581, filed Oct. 26, 2010. The present application claims priority to and the benefit of all the above-identified applications, which are incorporated by reference herein.

The invention relates to the field of in-mould labelling, in which a label is arranged in a mould cavity of a mould and plastic is subsequently injected into the mould cavity in order to form an injection-moulded product with the label.

The invention relates in particular to a method for arranging a label in a mould cavity of a mould, such as an injection mould, which mould cavity is delimited by an internal peripheral surface which defines a first axial axis of the mould cavity, the method comprising:

providing a mandrel having a peripheral wall, which defines an axial direction and a peripheral direction, which peripheral wall defines a second axial axis, the peripheral wall being provided with:
  a peripheral part having a shape which substantially corresponds to the shape of a part of the internal peripheral surface of the mould cavity, and
  a non-convex part which extends in the axial direction of the peripheral wall of the mandrel,
arranging the label around the peripheral wall of the mandrel, which label comprises a first side edge part and a second side edge part, in which the label is arranged around the peripheral wall of the mandrel in such a manner that the second side edge part overlaps the first side edge part in the peripheral direction of the mandrel at the location of the non-convex part of the peripheral wall of the mandrel,
introducing the mandrel with the label arranged around the peripheral wall thereof into the mould cavity,
transferring the label from the peripheral wall of the mandrel to the internal peripheral surface of the mould cavity.

WO2006/082006 discloses a method and device for transferring a label in a substantially cylindrical injection mould. The label is wound around an insertion mandrel. The insertion mandrel is provided with suction openings around its periphery, as a result of which the label can be held against the periphery of the insertion mandrel by means of underpressure. The inner diameter of the injection mould is only slightly larger than the outer diameter of the insertion mandrel with the label arranged against it. On its periphery, the insertion mandrel has a flattened portion which makes it possible for the overlapping side edges of the label not to enlarge the outer diameter of the insertion mandrel and not to prevent the introduction of the insertion mandrel into the injection mould. The gap between the label and the inner periphery of the mould is kept as small as possible. A film/foil having a thickness of 40-140 μm is used, for example, as a label. The distance between the outer periphery of the mandrel and the inner periphery of the injection mould is kept as small as possible, so that, after the label has been introduced into the injection mould, the label can be transferred from the mandrel to the inner periphery of the injection mould by means of blow pressure. An increase in the periphery of the mandrel with label is locally prevented by the flattened portion on the periphery of the mandrel in the area of the overlapping side edges of the label.

As the distance between the outer periphery of the mandrel and the inner periphery of the injection mould is kept as small as possible, the tolerance during the introduction of the mandrel into the injection mould is (very) small. During the introduction, the mandrel is displaced across a considerable distance from a position in front of the injection mould to a position in the mould cavity in which the label can be transferred. In view of the desired high speed of the injection-moulding process, such displacements require a considerable degree of acceleration and deceleration. As a result of the great weight of the mandrel and the (very) small distance between the outer periphery of the mandrel and the inner periphery of the injection mould, the introduction of the mandrel into the injection mould may result in jamming and damage.

In addition, the label is usually printed on one side, as a result of which the label tends to warp. Also, in practice, so-called "donkey's ears" may be present or occur at one or more corners of the label. As the gap between the mandrel and the inner periphery of the injection mould is kept as small as possible, there is a risk that a "donkey's ear" on the label during the introduction of the mandrel into the injection mould prevents the label from being transferred to the injection mould in the correct position.

It is an object of the invention to provide an improved method for arranging a label in a mould.

This object is achieved according to the invention by the fact that the mandrel and the mould are arranged with respect to one another in such a manner that during transfer of the label from the peripheral wall of the mandrel to the internal peripheral surface of the mould cavity, the first axial axis of the internal peripheral surface of the mould cavity and the second axial axis of the peripheral wall of the mandrel are eccentric with respect to one another.

Between the peripheral wall of the mandrel and the internal peripheral surface of the mould cavity, there is an annular gap. The thickness of the annular gap determines the tolerance during the introduction of the mandrel into the mould cavity. From the point of view of tolerance while moving the mandrel into the mould cavity, it is desirable to make the annular gap relatively large. However, in order to position the label accurately in the mould, the thickness of the annular gap is limited—the label can only bridge a limited distance with sufficient accuracy while jumping over. For that reason, WO2006/082006 teaches that the distance between the peripheral wall of the mandrel and the internal peripheral surface of the mould cavity should be kept as small as possible.

The internal peripheral surface of the mould cavity has a first axial axis—a central axial axis or a geographic central axis of the internal peripheral surface of the mould cavity. The peripheral wall of the mandrel determines the second axial axis, in particular, the second axial axis is defined by the peripheral part of the peripheral wall of the mandrel.

According to the invention, the first axial axis of the internal peripheral surface of the mould cavity and the second axial axis of the peripheral wall of the mandrel are eccentric with respect to one another during transfer of the label. These axial axes are arranged at a distance from one another and mutually parallel during transfer of the label. Therefore, the peripheral wall of the mandrel and the internal peripheral surface of the mould cavity are arranged eccentrically with respect to one another during transfer of the label.

As a result thereof, a smallest distance is formed locally between the peripheral part of the peripheral wall of the mandrel and the internal peripheral surface of the mould cavity during transfer of the label. The smallest distance is sufficiently small to locally transfer the label accurately from the peripheral wall of the mandrel to the desired position on the internal peripheral surface of the mould cavity. After the label has been transferred to the mould cavity at the location of said smallest distance, the label can be unrolled from the peripheral wall of the mandrel from said position. This results in an accurate positioning of the entire label in the mould cavity.

During transfer of the label, it is possible, for example, to use air by means of which the label is blown off the peripheral wall of the mandrel and/or electrostatic means. Such means for transferring the label are generally known in this field.

According to the invention, the thickness of the annular gap is only limited locally for transferring the label. Beyond that, the distance between the peripheral wall of the mandrel and the internal peripheral surface of the mould cavity can be made relatively large, for example, by reducing the dimensions of the mandrel. According to the invention, it is possible to make the peripheral wall of the mandrel so small relative to the internal peripheral surface of the mould that the distance in between is sufficiently large to reduce the risk of jamming and damage during the introduction of the mandrel.

It is possible for the mandrel and the mould to be arranged in such a manner with respect to one another during the introduction of the mandrel with the label arranged around the peripheral wall thereof in the mould cavity that the first axial axis of the internal peripheral surface of the mould cavity and the second axial axis of the peripheral part of the peripheral wall of the mandrel are coaxial with respect to one another, and in which the mandrel and the mould are displaced with respect to one another in such a manner, after the introduction of the mandrel with the label arranged around the peripheral wall thereof into the mould cavity and prior to the transfer of the label from the peripheral wall of the mandrel to the internal peripheral surface of the mould cavity, that the first axial axis and the second axial axis come to lie eccentrically with respect to one another. As a result thereof, the tolerance during the introduction of the mandrel into the mould cavity is increased further, while the eccentric arrangement of the mandrel with respect to the mould cavity during transfer of the label ensures that positioning of the label in the mould cavity can be carried out particularly accurately.

It is possible for the internal peripheral surface of the mould cavity to have an inner periphery and the peripheral wall of the mandrel to have an outer periphery, and in which the outer periphery of the peripheral wall of the mandrel is at least 5 mm smaller than the inner periphery of the internal peripheral surface of the mould cavity. With such a difference in periphery between the peripheral wall of the mandrel and the internal peripheral surface of the mould cavity, the distance between the peripheral wall of the mandrel and the internal peripheral surface of the mould cavity during introduction of the mandrel is relatively large.

The peripheral wall of the mandrel may be smaller than the internal peripheral surface of the mould cavity in such a manner that when the peripheral wall of the mandrel, in particular of the peripheral part of the peripheral wall of the mandrel, is arranged coaxially with respect to the internal peripheral surface of the mould cavity in an imaginary manner, an annular gap is formed in between which has a thickness of at least 1.5 mm everywhere. Such a thickness of the annular gap results in an improved tolerance when the mandrel is introduced into the mould cavity, while the label can still be transferred accurately.

In this case, it is possible for the second side edge part to overlap the first side edge part in the peripheral direction of the mandrel over a distance of at least 9 mm after the label has been arranged around the peripheral wall of the mandrel. The outer periphery of the peripheral wall of the mandrel is, for example, determined by the sum of the outer periphery of the peripheral part and the outer periphery of the non-convex part. The outer periphery of the peripheral wall of the mandrel can be reduced by reducing the diameter of the peripheral part or by increasing the non-convex part. The distance over which the side edge parts overlap one another thus depends on the cross-sectional shape and dimensions of the peripheral wall of the mandrel.

The first side edge part of the label is delimited by a first side edge and the second side edge part of the label is delimited by a second side edge. In one embodiment, the dimensions of the label are such that after transfer of the label from the peripheral wall of the mandrel to the internal peripheral surface of the mould cavity, the first side edge and the second side edge closely adjoin one another. The label has a width which is determined by the distance between the side edges. The width of the label is substantially equal to the inner periphery of the peripheral surface of the mould. By winding the label over its width around the peripheral wall of the mandrel, the outer periphery of which is smaller than the inner periphery of the peripheral surface of the mould cavity, the overlapping side edge parts of the label are created. The width of the label is, for example, such that the second side edge part overlaps the first side edge part over a distance of 9 mm, as has been indicated above. After the label has been transferred, the side edges of the label closely adjoin one another against the peripheral surface of the mould cavity.

It is possible that, during the transfer of the label from the peripheral wall of the mandrel to the internal peripheral surface of the mould, an annular gap is formed between the peripheral part of the peripheral wall of the mandrel and the internal peripheral surface of the mould cavity, which gap has a thickness which varies in the peripheral direction, the thickness of the annular gap being smallest at the location of a first zone of the peripheral part of the peripheral wall of the mandrel and increasing in the peripheral direction on both sides of the first zone. During transfer of the label, the peripheral wall of the mandrel is eccentric with respect to the internal peripheral surface of the mould cavity. As a result thereof, the peripheral part of the peripheral wall of the mandrel comprises a first zone which is situated locally at a smallest distance from the peripheral surface of the mould cavity during said transfer. The label can accurately jump over from said first zone.

It is possible for the first zone of the peripheral part of the peripheral wall of the mandrel to be formed by a central zone which is situated substantially diametrically opposite the non-convex part. As a result thereof, the smallest distance during transfer of the label is situated substantially diametrically opposite the non-convex part. This is favourable for accurately positioning the label in the mould during transfer of the label.

In this case, the label may be provided with a first part which, after the label has been arranged around the peripheral wall of the mandrel, adjoins the first zone of the peripheral part, in which case—during transfer of the label—initially the first part of the label, followed by parts of the label on both sides of the central part and the second side edge part and ultimately the first side edge part are transferred to the internal peripheral surface of the mould cavity. The first part of the label is, for example, a central part which adjoins the central zone of the peripheral part of the peripheral wall of the mandrel after the label has been arranged.

During the introduction of the mandrel in the mould cavity, the first side edge part and the second side edge part are each held against the non-convex part of the peripheral wall of the mandrel. In order to hold the side edge parts, the mandrel may be provided, at the non-convex part of the peripheral wall, with a first retaining means and a second retaining means, in which the first side edge part of the label is held against the non-convex part by the first retaining means and in which the second side edge part of the label is held against the non-convex part by the second retaining means after the label has been arranged around the peripheral wall. Both the first side edge part and the second side edge part of the label are held against the non-convex part by the retaining means, so that said side edge parts of the label do not protrude tangentially with respect to the peripheral part of the peripheral wall of the mandrel. During the introduction of the mandrel into the mould cavity, the side edge parts are inside the internal peripheral surface of the mould cavity.

The retaining means may be configured in different ways. The first retaining means and second retaining means may, for example, each be provided with one or more fluid openings in the peripheral wall of the mandrel for sucking in air for creating an underpressure with respect to the environment. The fluid openings are connected to a source for providing the underpressure, such as a vacuum source. While air is being sucked into the fluid openings, a suction force is applied to the respective side edge parts of the label.

The peripheral wall may optionally be provided with further retaining means, such as a retaining means in the central zone of the peripheral part of the peripheral wall of the mandrel for engaging the central part of the label. The retaining means in the central zone of the peripheral part of the peripheral wall of the mandrel may comprise at least one fluid opening for engaging the central part of the label.

In one embodiment, sucking air into the central zone via the fluid opening is stopped first during transfer of the label from the peripheral wall of the mandrel to the internal peripheral surface of the mould cavity, after which sucking air via the fluid opening which engages with the second side edge part is stopped, and subsequently sucking air via the fluid opening which engages with the first side edge part is stopped. In this way, the label can be "unrolled" in a controlled manner from the peripheral wall of the mandrel onto the internal peripheral surface of the mould cavity.

The non-convex part of the peripheral wall of the mandrel may be provided with two flat parts and a stepped part which connects the flat parts to one another, in which the stepped part has a height which extends transversely with respect to the axial direction, and in which the label has a thickness which is smaller than the height of the stepped part. The stepped part of the non-convex part of the peripheral wall of the mandrel forms a step. The step has a length which runs in the axial direction. The first retaining means and the second retaining means of the non-convex part may at least partly extend into the first and second flat part, respectively, that is to say on both sides of the step. Even if one or more "donkey's ears" have formed on the corners of the label, the side edge parts of the label can be reliably applied in an overlapping manner since the step can at least partly compensate for the "donkey's ears".

The internal peripheral surface of the mould cavity may have a substantially constant cross section in the axial direction, with the peripheral wall of the mandrel having a substantially constant cross section in the axial direction. The cross section of the internal peripheral surface of the mould cavity is substantially constant in the axial direction, that is to say the dimensions of the internal peripheral surface of the mould cavity remain substantially unaltered. The method according to the invention is particularly suitable for mould cavities having a constant cross section, as is the case when producing plastic squeeze tubes. With a mould cavity with a constant cross section, the tolerance during introduction of the mandrel is smaller than with a mould cavity having a conical cross section which decreases in diameter in the axial direction from the introduction side. The improved tolerance of the method according to the invention is therefore advantageous, in particular, for a mould cavity with a constant cross section.

The mould cavity with a constant cross section may be designed in different ways. In one embodiment, the peripheral part of the peripheral wall is curved, in which the non-convex part of the peripheral wall is recessed with respect to the curved peripheral part, and in which the second axial axis of the peripheral wall of the mandrel being formed by the axial axis of the peripheral part of the peripheral wall. The second axial axis of the peripheral wall of the mandrel is in this case determined by the peripheral part of the peripheral wall of the mandrel. In other words, the second axial axis forms the central axial axis or geographic central axis of the peripheral part.

For example, the internal peripheral surface of the mould is cylindrical and/or the peripheral part of the peripheral wall of the mandrel defines a cylinder segment. The term cylinder segment is understood to mean that the peripheral wall of the mandrel is cylindrical except for the non-convex part. In this case, the peripheral part of the peripheral wall of the mandrel has a radius which is constant, in cross section, from the second axial axis and the non-convex part is at a distance from the second axial axis, in cross section, which is smaller than the constant radius everywhere. In this case, the diameter of the peripheral part of the peripheral wall of the mandrel is, for example, at least 3 mm smaller than the diameter of the internal peripheral surface of the mould. However, other cross-sectional shapes are also possible, such as a cross-sectional shape consisting of two half circles which are connected by two straight lines, an oval cross-sectional shape or any other cross-sectional shapes.

The mould may be provided with several mould cavities which each have an associated internal peripheral surface, and in which several mandrels are provided, for example, on a common carrier, which are each of a design according to the above-described mandrel, and in which in each case one label is arranged around the peripheral wall of each mandrel, and in which the mandrels together with the labels which have been arranged around the peripheral wall thereof are simultaneously inserted into the mould cavities. Due to the relatively large tolerance according to the invention, several mandrels can be inserted simultaneously in the mould cavities of a mould.

The invention also relates to a method for injection-moulding an injection-moulded product, comprising a method as described above, in which, following transfer of the label from the peripheral wall of the mandrel to the internal peripheral surface of the mould cavity, a core is inserted into the mould cavity and the injection-moulded product is formed by injection-moulding while the label is situated between the internal peripheral surface of the mould cavity and the core. The resulting injection-moulded product has, for example, a cylindrical peripheral wall. The injection-moulded product is, for example, a squeeze tube, if desired with an integrally injection-moulded cap.

The invention also relates to an injection-moulding device, comprising:

a mould comprising a mould cavity, which mould cavity is delimited by an internal peripheral surface which defines a first axial axis, and a device for arranging a label in the mould cavity of the mould, which device comprises a mandrel with a peripheral wall which defines an axial direction and a peripheral direction, which peripheral wall defines a second axial axis, and which peripheral wall is provided with:
- a peripheral part having a shape which substantially corresponds to the shape of a part of the internal peripheral surface of the mould cavity, and
- a non-convex part which extends in the axial direction of the peripheral wall of the mandrel, in which the peripheral wall is designed in such a manner that the label can be arranged around the peripheral wall of the mandrel in such a manner that the label comprises a first side edge part and a second side edge part which can be arranged around the peripheral wall of the mandrel, so that the second side edge part overlaps the first side edge part at the location of the non-convex part of the peripheral wall of the mandrel in the peripheral direction of the mandrel, in which the mandrel with a label which has been arranged in such a manner around the peripheral wall thereof can be moved between a label-receiving position outside the mould cavity and a position in the mould cavity for dispensing the label, and in which the device is provided with means for transferring the label from the peripheral wall of the mandrel to the internal peripheral surface of the mould cavity, in which the mandrel and the mould can be displaced with respect to one another in such a manner that during transfer of the label from the peripheral wall of the mandrel to the internal peripheral surface of the mould cavity, the first axial axis of the internal peripheral surface of the mould cavity and the second axial axis of the peripheral wall of the mandrel are eccentric with respect to one another.

This device may be configured according to one or more of the features according to one or more of the claims and/or according to one or more of the characteristics which have been mentioned in this description. The invention also relates to an injection-moulding device as described above comprising a label.

The injection-moulding device may be provided with a core which can be moved between a position outside the mould and a position inside the mould, in which the mould is provided with a supply opening for injecting plastic into the mould cavity of the mould.

The invention will now be explained in more detail with reference to an exemplary embodiment illustrated in the figures, in which:

FIGS. 1a, 1b show perspective views of a mandrel for arranging a label in a mould cavity of a mould;

FIGS. 3a, 3b, 3c, 3d show front views of the mandrel illustrated in FIGS. 1a, 1b which is accommodated in a mould cavity, in which a label which is arranged around the mandrel is transferred from the mandrel to the mould cavity of the mould;

FIG. 4 shows a perspective view of a multiple system for use with a mould having several mould cavities.

Figure 1B:
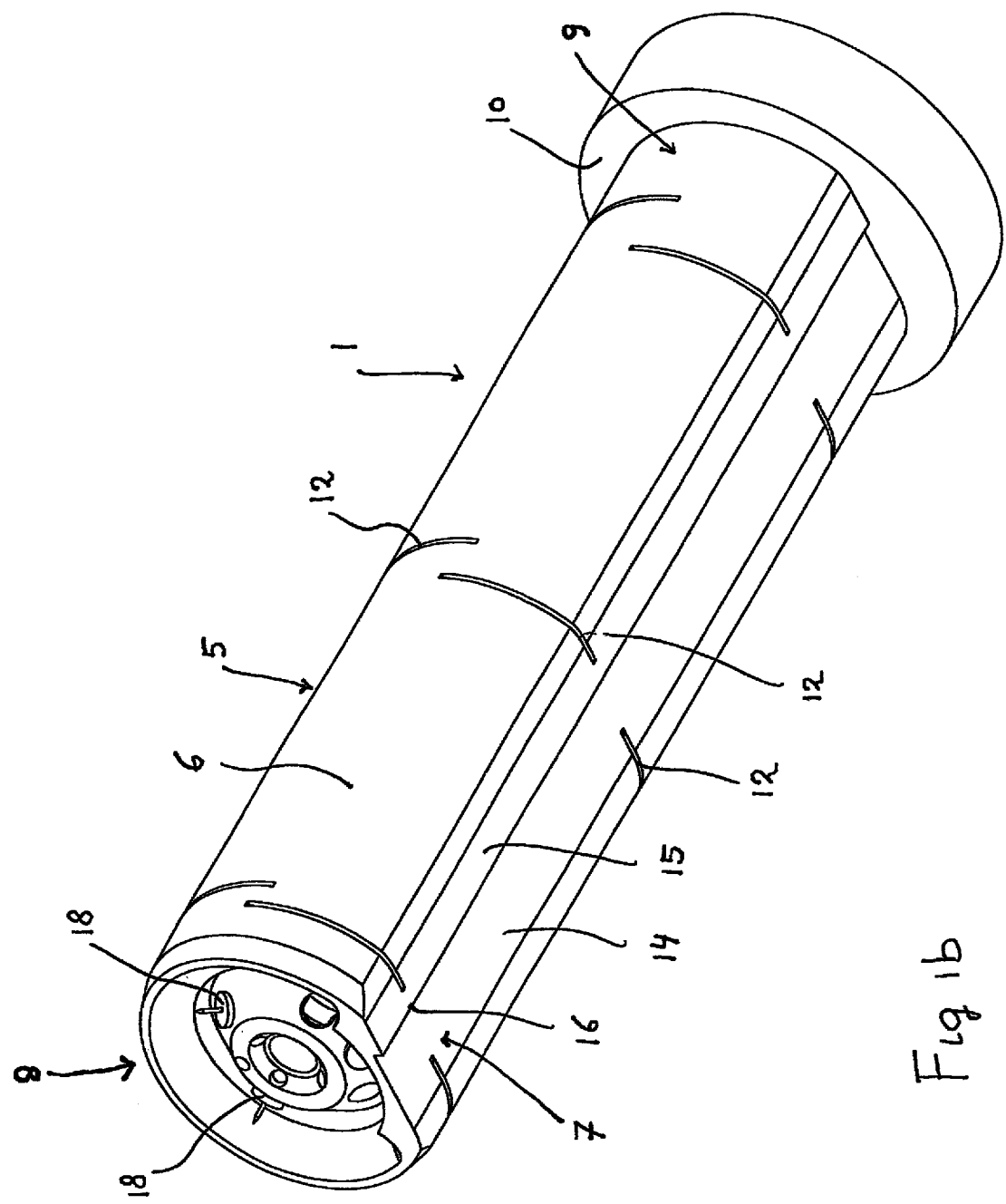
Figure 2:
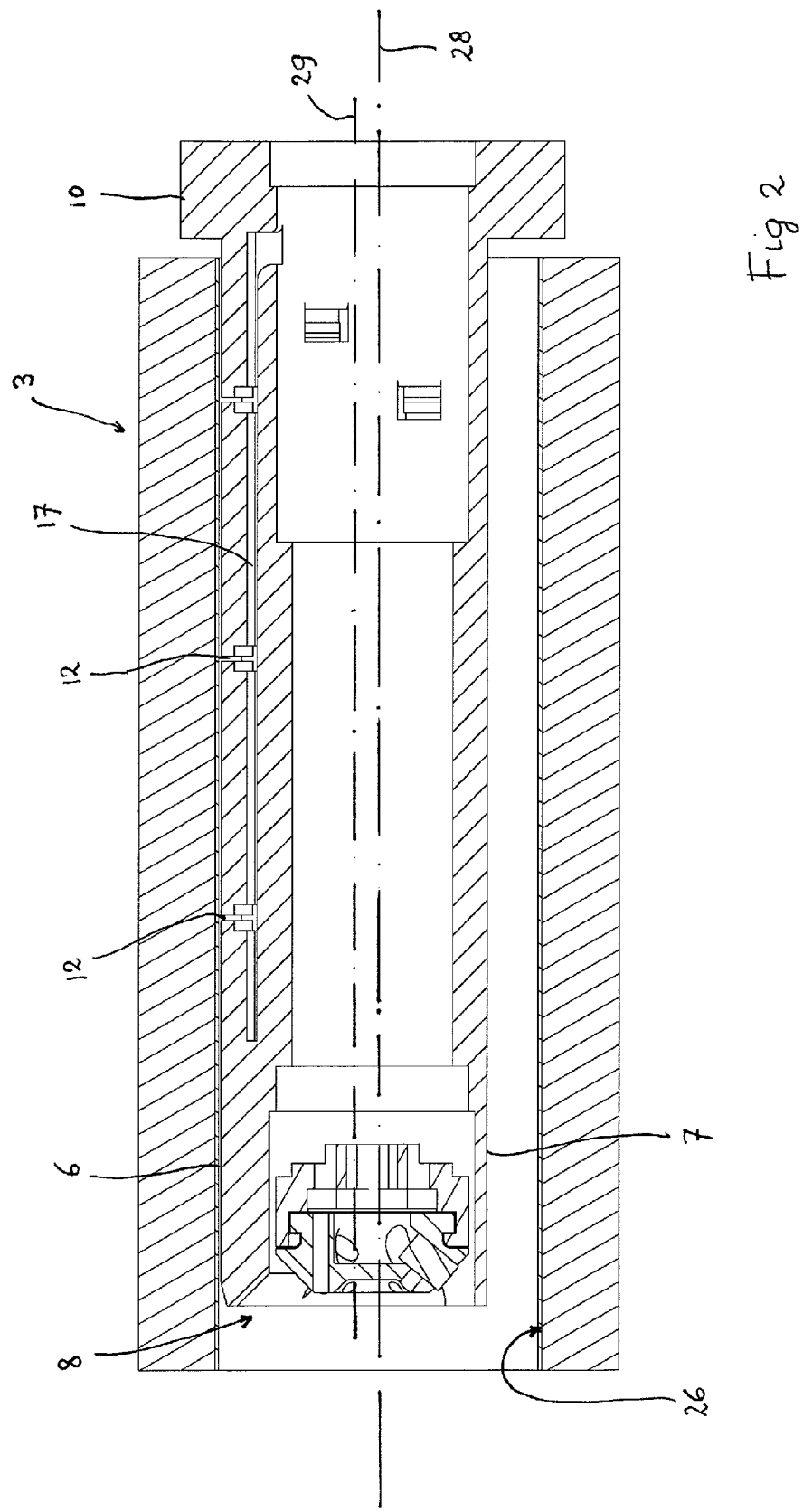
FIG. 2 shows a view in cross section of the mandrel illustrated in FIGS. 1a, 1b which is accommodated in a mould cavity of a mould.

A mandrel 1 is used to place a label 20 in an injection mould 3 (see FIG. 2, 3a-3d). The injection mould 3 has an internal peripheral surface 26. In this exemplary embodiment, the internal peripheral surface 26 of the injection mould 3 is cylindrical.

The mandrel 1 forms a pseudocore for arranging the label in the injection mould 3. The mandrel 1 is illustrated in more detail in FIGS. 1a, 1b. The mandrel 1 comprises a peripheral wall 5 which defines an axial direction and a peripheral direction. At one end 9, the peripheral wall 5 is attached to an annular flange 10. The opposite end 8 of the peripheral wall 5 forms a free end.

The peripheral wall 5 of the mandrel 1 comprises a peripheral part 6 and a non-convex part 7. The peripheral part 6 has a shape which substantially corresponds to the shape of a part of the internal peripheral surface 26 of the injection mould 3. As the internal peripheral surface 26 of the injection mould 3 is cylindrical in this exemplary embodiment, the peripheral part 6 of the peripheral wall 5 of the mandrel 1 is configured as a cylinder segment.

In this exemplary embodiment, the non-convex part 7 of the peripheral wall 5 of the mandrel 1 comprises two flat or flattened parts 14, 15 which are attached to one another by means of a stepped part 16. The flat parts 14, 15 are flattened in the peripheral direction with respect to the contour of the peripheral part 6 of the peripheral wall 5 of the mandrel 1.

It should be noted that the non-convex part may be configured differently. In this application, the term non-convex part is understood to mean a part which is at least partly flattened, recessed or set back, for example, hollow. The non-convex part may comprise a combination of flat and/or recessed and/or hollow parts.

The internal peripheral surface 26 of the injection mould 3 defines an inner periphery of the injection mould 3. The peripheral part 6 and the non-convex part 7 of the peripheral wall 5 of the mandrel 1 together define an outer periphery of the peripheral wall 5. The outer periphery of the peripheral wall 5 is smaller than the inner periphery of the internal peripheral surface 26, so that the mandrel 1 can be accommodated in the injection mould 3.

The peripheral wall 5 of the mandrel 1 is smaller than the internal peripheral surface 26 of the injection mould 3 in such a manner that, when the peripheral part 6 of the peripheral wall 5 of the mandrel 1 is arranged coaxially with respect to the internal peripheral surface 26 of the injection mould 3 in an imaginary manner, an annular gap is present in between which has a thickness of at least 1 mm everywhere, preferably at least 1.5 mm. Using such dimensions, the mandrel 1 can be moved in and out of the injection mould 3 with a relatively large tolerance.

The peripheral wall 5 of the mandrel 1 is configured for winding the label 20 around it. The label 20 is, for example, a film having a thickness of 40-140 μm. The label 20 is provided with a first side edge part 22 and a second side edge part 24, each of which is delimited by a first side edge 21 and second side edge 23, respectively. The distance between the side edges 21, 23 determines a width of the label 20.

When winding the label 20 around the peripheral wall 5 of the mandrel 1, the side edge parts 22, 24 of the label 20 are arranged around the peripheral wall 5 in the peripheral direction. The width of the label 20 is equal to the inner periphery of the injection mould 3. Therefore, the width of the label 20 is larger than the outer periphery of the peripheral wall 5 of the mandrel 1, so that the side edge parts 22, 24 overlap one another.

In this exemplary embodiment, the side edge parts 22, 24 of the label 20 overlap one another over a distance of at least 9 mm. As can be seen in FIGS. 3a-3d, the width of the first flat part 14 is substantially equal to the overlap. The total width of the non-convex part 7 is determined by the width of the first and second flat parts 14, 15 together, that is to say the total width of the non-convex part 7 is larger than the overlap.

In this exemplary embodiment, the label 20 has a rectangular shape with two long sides and two narrow sides. On the long sides of the label 20 are the side edges 21, 23. The annular flange 10 forms a stop for one of the narrow sides of the label 20.

The peripheral wall 5 comprises retaining means for retaining the label 20 against the peripheral wall 5. In this exemplary embodiment, the retaining means comprise several series of slot-shaped fluid openings 12. Each of the slot-shaped fluid openings 12 extends in the peripheral direction. Each series of fluid openings 12 is connected to in each case a fluid duct 17 (see FIGS. 1*a*, 1*b* and 2). The fluid ducts 17 are connected to a pressure-control unit (not shown) which can set an underpressure or an overpressure with respect to the environment at the fluid openings 12. In other words, the fluid openings 12 can be actuated to suck air in or to blow air out.

As is illustrated most clearly in FIG. 1*b*, the fluid openings 12 of two series extend partly in the two flat parts 14, 15. In addition, a series of fluid openings 12 is arranged in a central zone of the peripheral part 6 which is situated substantially diametrically opposite the flat parts 14, 15. Furthermore, an intermediate series of fluid openings 12 is in each case arranged on either side of the central zone of the peripheral part 6.

By applying an underpressure with respect to the environment at the fluid openings 12, the label 20 can be held against the peripheral wall 5 of the mandrel 1. The first side edge part 22 and the second side edge part 24 are in this case sucked against the flat parts 14, 15 so that said side edge parts 22, 24 are folded inwards at the transition from the peripheral part 6 to the flat parts 14, 15 and do not protrude tangentially from the peripheral part 6.

The height of the stepped part 16 between the flat parts 14, 15 is greater than the thickness of the label 20. Consequently, it is possible to ensure that the second side edge part 24 overlaps the first side edge part 22, even if the first side edge part 22 is slightly curled at the corners thereof.

The mandrel 1 is provided with means 18 for statically charging the label 20. Such means 18 are generally known in this field and will therefore not be explained in any more detail. By blowing air out via the fluid openings 12 and/or static charging, the label 20 can be transferred from the peripheral wall 5 of the mandrel 1 to the internal peripheral surface 26 of the injection mould 3.

The introduction of the label 20 in the injection mould 3 will now be described in more detail with reference to FIGS. 2, 3*a*-3*d*.

In a starting position, the mandrel 1 is in a label-receiving position outside the injection mould 3 and the label 20 is wound around the peripheral wall 5 of the mandrel 1. The label 20 is held against the peripheral wall 5 of the mandrel 1 by means of the fluid openings 12 through which air is being sucked in. The side edge parts 22, 24 overlap at the location of the flat part 14 and are held against the flat parts 14, 15 due to the sucking action of the fluid openings 12.

The mandrel 1 with the label 20 wound around the peripheral wall 5 is then moved from the label-receiving position to a position in the injection mould 3 for transferring the label 20. During the displacement of the mandrel 1 with the label 20 wound around the peripheral wall 5 in the injection mould, the peripheral part 6 of the peripheral wall 5 of the mandrel 1 and the internal peripheral surface 26 of the injection mould 3 are, for example, coaxially aligned with respect to one another. As a result thereof, the annular gap 31 between the peripheral wall 5 of the mandrel 1 and the internal peripheral surface 26 of the injection mould 3 is maximized during the introduction of the mandrel 1.

After the mandrel 1 has been moved into the desired end position in the injection mould 3, the mandrel 1 together with the label 20 wound around the peripheral wall 5 is radially displaced in such a manner that the first axial axis 28 of the internal peripheral surface 26 of the injection mould 3 and the second axial axis 29 of the peripheral part 6 of the peripheral wall 5 of the mandrel 1 are eccentric with respect to one another. The second axial axis 29 of the peripheral part 6 of the peripheral wall 5 is defined by the central axis of the peripheral part 6 of the peripheral wall 5. This is illustrated in FIGS. 2, 3*a*-3*d*. In this case, the annular gap 31 between the peripheral part 6 of the peripheral wall 5 of the mandrel 1 and the internal peripheral surface 26 of the injection mould 3 has a varying thickness. At the location of the central zone of the peripheral part 6 of the peripheral wall 5 of the mandrel 1, a smallest distance is formed between the peripheral part 6 of the peripheral wall 5 of the mandrel 1 and the internal peripheral surface 26 of the injection mould 3 (at the top in FIGS. 3*a*-3*d*). The thickness of the annular gap 31 increases from the central zone to the flat parts 14, 15.

While the mandrel 1 with the label 20 wound around the peripheral wall 5 is kept eccentric with respect to the internal peripheral surface 26 of the injection mould 3, the underpressures are first released from the series of fluid openings 12 in the central zone of the peripheral wall 5 of the mandrel 1. As a result thereof, the central part of the label 20 which abuts the central zone of the peripheral part 6 after the label 20 was wound around the peripheral wall 5 of the mandrel 1, can jump to the internal peripheral surface 26 of the injection mould 3 (see FIG. 3*b*).

Thereafter, the sucking action by the adjacent series of fluid openings 12 on a side of the central zone is stopped (on the right-hand side in FIG. 3*c*), so that the label 20 there becomes detached from the peripheral part 6 of the peripheral wall 5 of the mandrel 1. Then, the pressure-control unit releases the underpressure at the series of fluid openings 12 which extend in the second flat part 15, so that the second side edge part 24 of the label 20 jumps against the internal peripheral surface 26 of the injection mould 3 (see FIG. 3*c*). Subsequently, the underpressure is released at the series of fluid openings 12 which debouch on the opposite side of the central zone and in the first flat part 14. The first side edge part 22 of the label 20 then jumps against the internal peripheral surface 26 of the injection mould 3 (see FIG. 3*d*).

However, it is also possible that the sucking action by the adjacent series of fluid openings 12 is stopped at substantially the same time on either side of the central zone, so that the label 20 can be detached there from the peripheral part 6 of the peripheral wall 5 of the mandrel 1 approximately simultaneously. Then, the pressure-control unit releases the underpressure at the series of fluid openings 12 which extend in the second flat part 15 and thereafter at the series of fluid openings 12 which debouch in the first flat part 14. The second side edge part 24 and the first side edge part 22 of the label 20 then jump against the internal peripheral surface 26 of the injection mould 3.

The label 20 is therefore "unrolled" on both adjacent sides simultaneously or successively from the central part against the internal peripheral surface 26 of the injection mould 3. After the label 20 has been transferred, the side edges 21, 23 thereof form a seam. According to the invention, it is ensured that the seam is (very) close-fitting.

Once the label 20 bears against the internal peripheral surface 26 of the injection mould 3, the mandrel 1 without label 20 is removed from the injection mould by radially displacing the mandrel 1 so that the first axial axis 28 of the internal peripheral surface 26 of the injection mould 3 and the second axial axis 29 of the peripheral part 6 of the peripheral wall 5 of the mandrel 1 come to lie coaxially with respect to one another again (not shown). As a result thereof, the annular gap 31 between the peripheral wall 5 of the mandrel 1 and the internal peripheral surface 26 of the injection mould 3 during removal of the mandrel 1 is maximized.

Thereafter, a core can be inserted into the injection mould 3 and an injection-moulded part with the label 20 can be formed in the injection mould 3 (not shown). As the label 20 is accurately positioned in the injection mould 3, the seam in the injection-moulded part formed by the side edges 21, 23 of the label 20 is hardly visible, if at all.

FIG. 4 shows a multiple system with four mandrels for use with a mould having four mould cavities. Each mandrel 1 of this multiple system is configured as described above with reference to FIGS. 1-3. Via the annular flange 10, the mandrels 1 are each attached to an adjusting mechanism 35 for rotating the mandrels 1 around the axial axis. As a result thereof, the location of the seam of the label 20 in the moulds can be adjusted.

The invention is not limited to the exemplary embodiment illustrated in the figures. For example, the mandrel 1 may be introduced eccentrically into the injection mould 3 from the label-receiving position to the position for dispensing the label 20. In this case, the annular gap 31 is not as large as possible during the movement of the mandrel 1 in the injection mould 3—there is a smallest play at the location of the central zone—but the tolerance can still be ensured by making the dimensions of the peripheral wall 5 of the mandrel 1 sufficiently small. In this case, a radial displacement from a coaxial position to an eccentric position can be omitted. The same applies to the movement for removing the mandrel 1 from the injection mould 3, that is to say after the label 20 has been transferred, the mandrel 1 can be removed from the injection mould 3 while the first axial axis 28 of the internal peripheral surface 26 of the injection mould 3 and the second axial axis 29 of the peripheral part 6 of the peripheral wall 5 of the mandrel 1 remain eccentric with respect to one another.

The invention claimed is:

1. A method for arranging a label in a mould cavity of a mould, which mould cavity is delimited by an internal peripheral surface that defines a first axial axis of the mould cavity, the method comprising:
   providing a mandrel having a peripheral wall that defines an axial direction and a peripheral direction, wherein the peripheral wall further defines a second axial axis, the peripheral wall being provided with:
      a peripheral part having a shape that substantially corresponds to a shape of a part of the internal peripheral surface of the mould cavity, and
      a non-convex part that extends in the axial direction of the peripheral wall of the mandrel,
   arranging the label around the peripheral wall of the mandrel, which label comprises a first side edge part and a second side edge part, in which the label is arranged around the peripheral wall of the mandrel in such a manner that the second side edge part overlaps the first side edge part viewed in the peripheral direction of the mandrel at a location of the non-convex part of the peripheral wall of the mandrel,
   introducing the mandrel with the label arranged around the peripheral wall thereof into the mould cavity,
   transferring the label from the peripheral wall of the mandrel to the internal peripheral surface of the mould cavity,
   wherein
   the mandrel and the mould are arranged with respect to one another in such a manner during transfer of the label from the peripheral wall of the mandrel to the internal peripheral surface of the mould cavity, that the first axial axis of the internal peripheral surface of the mould cavity and the second axial axis of the peripheral wall of the mandrel are eccentric with respect to one another.

2. The method according to claim 1, wherein the mandrel and the mould are arranged in such a manner with respect to one another during the introduction of the mandrel with the label arranged around the peripheral wall thereof into the mould cavity that the first axial axis of the internal peripheral surface of the mould cavity and the second axial axis of the peripheral wall of the mandrel are coaxial with respect to one another, and in which the mandrel and the mould are displaced with respect to one another in such a manner, after the introduction of the mandrel with the label arranged around the peripheral wall thereof into the mould cavity and prior to the transfer of the label from the peripheral wall of the mandrel to the internal peripheral surface of the mould cavity, that the first axial axis and the second axial axis come to lie eccentrically with respect to one another.

3. The method according to claim 1, wherein the internal peripheral surface of the mould cavity has an inner periphery, and the peripheral wall of the mandrel has an outer periphery, and wherein the outer periphery of the peripheral wall of the mandrel is at least 5 mm smaller than the inner periphery of the internal peripheral surface of the mould cavity.

4. The method according to claim 1, wherein the peripheral wall of the mandrel is smaller than the internal peripheral surface of the mould cavity in such a manner that if the peripheral wall of the mandrel is arranged coaxially with respect to the internal peripheral surface of the mould cavity, an annular gap at least 1.5 mm is formed in between the peripheral wall of the mandrel and the internal peripheral surface of the mould cavity around a periphery of the peripheral wall of the mandrel.

5. The method according to claim 1, wherein the second side edge part overlaps the first side edge part, when viewed in the peripheral direction of the mandrel, over a distance of at least 9 mm after the label has been arranged around the peripheral wall of the mandrel.

6. The method according to claim 1, wherein the first side edge part of the label is delimited by a first side edge and the second side edge part of the label is delimited by a second side edge, and in which dimensions of the label are such that after transfer of the label from the peripheral wall of the mandrel to the internal peripheral surface of the mould cavity, the first side edge and the second side edge closely adjoin one another.

7. The method according to claim 1, wherein, during the transfer of the label from the peripheral wall of the mandrel to the internal peripheral surface of the mould cavity, an annular gap is formed between the peripheral wall of the mandrel and the internal peripheral surface of the mould cavity, which gap has a thickness which varies in the peripheral direction, the thickness of the annular gap being smallest at the location of a first zone of the peripheral part of the peripheral wall of the mandrel and increasing in the peripheral direction on both sides of the first zone.

8. The method according to claim 7, wherein the first zone of the peripheral part of the peripheral wall of the mandrel is formed by a central zone which is situated substantially diametrically opposite the non-convex part.

9. The method according to claim 7, wherein the label is provided with a first part which, after the label has been arranged around the peripheral wall of the mandrel, adjoins the first zone of the peripheral part, and wherein initially the first part of the label, followed by parts of the label on both sides of the first part and the second side edge part, and thereafter the first side edge part, are transferred to the internal peripheral surface of the mould cavity.

10. The method according to claim 1, wherein the mandrel, at the non-convex part of the peripheral wall, is provided with a first retaining means and a second retaining means, and wherein the first side edge part of the label is held against the non-convex part by the first retaining means and wherein the second side edge part of the label is held against the non-convex part by the second retaining means after the label has been arranged around the peripheral wall.

11. The method according to claim 10, wherein the first retaining means and the second retaining means are each provided with at least one fluid opening that extends in the peripheral wall of the mandrel, and wherein, after the label has been arranged around the peripheral wall, the first side edge part of the label is held against the non-convex part by sucking air through the fluid opening of the first retaining means for creating an under pressure with respect to an environment, and wherein the second side edge part of the label is retained against the non-convex part by sucking air through the fluid opening of the second retaining means for creating an under pressure with respect to the environment.

12. The method according to claim 1, wherein the non-convex part of the peripheral wall of the mandrel is provided with two flat parts and a stepped part that connects the flat parts to one another, wherein the stepped part has a height that extends transversely with respect to the axial direction, and wherein the label has a thickness that is smaller than the height of the stepped part.

13. The method according to claim 1, wherein the internal peripheral surface of the mould cavity has a substantially constant cross section in the axial direction, and wherein the peripheral wall of the mandrel has a substantially constant cross section in the axial direction.

14. The method according to claim 1, wherein the peripheral part of the peripheral wall is curved, and wherein the non-convex part of the peripheral wall is recessed with respect to the curved peripheral part, and wherein the second axial axis of the peripheral wall of the mandrel is formed by the axial axis of the peripheral part of the peripheral wall.

15. The method according to claim 1, wherein the internal peripheral surface of the mould cavity is cylindrical, and wherein the peripheral part of the peripheral wall of the mandrel defines a cylinder segment.

16. The method according to claim 1, wherein the mould is provided with several mould cavities that each have an associated internal peripheral surface, and wherein several mandrels are provided that are configured according to the mandrel recited in claim 1, and wherein a label is in each case arranged around the peripheral wall of each mandrel, and in which wherein the mandrels with the labels are simultaneously introduced into the mould cavities.

17. The method for injection-moulding an injection-moulded product, comprising the method according to claim 1, wherein, following transfer of the label from the peripheral wall of the mandrel to the internal peripheral surface of the mould cavity, a core is inserted into the mould cavity and the injection-moulded product is formed by injection-moulding while the label is situated between the internal peripheral surface of the mould cavity and the core.

18. An injection moulding device comprising:
a mould comprising a mould cavity, wherein the mould cavity is delimited by an internal peripheral surface that defines a first axial axis, and
a device for arranging a label in the mould cavity of the mould, wherein the device comprises a mandrel with a peripheral wall that defines an axial direction and a peripheral direction, wherein the peripheral wall defines a second axial axis, and wherein the peripheral wall is provided with:
a peripheral part having a shape that substantially corresponds to a shape of a part of the internal peripheral surface of the mould cavity, and
a non-convex part that extends in the axial direction of the peripheral wall of the mandrel,
wherein the peripheral wall is designed in such a manner that the label is arranged around the peripheral wall of the mandrel in such a manner that the label comprises a first side edge part and a second side edge part that can be arranged around the peripheral wall of the mandrel so that the second side edge part overlaps the first side edge part at a location of the non-convex part of the peripheral wall of the mandrel, when viewed in the peripheral direction of the mandrel,
in wherein the mandrel with a label that has been arranged in such a manner around the peripheral wall thereof can be moved between a label-receiving position outside the mould cavity and a position in the mould cavity for dispensing the label,
and wherein the device is provided with means for transferring the label from the peripheral wall of the mandrel to the internal peripheral surface of the mould cavity,
wherein the mandrel and the mould can be displaced with respect to one another in such a manner that during transfer of the label from the peripheral wall of the mandrel to the internal peripheral surface of the mould cavity, the first axial axis of the internal peripheral surface of the mould cavity and the second axial axis of the peripheral part of the peripheral wall of the mandrel are eccentric with respect to one another.

19. The injection-moulding device according to claim 18, wherein the injection-moulding device is provided with a core that can be moved between a position outside the mould cavity and a position in the mould cavity, and wherein the mould is provided with a supply opening for supplying plastic to the mould cavity of the mould.

* * * * *